United States Patent
Benko, Jr.

[15] 3,658,154
[45] Apr. 25, 1972

[54] CENTRALIZED GREASING SYSTEM

[72] Inventor: Stephen Edward Benko, Jr., 1055 Rosalie Avenue, Lakewood, Ohio 44107

[22] Filed: Feb. 2, 1970

[21] Appl. No.: 7,882

[52] U.S. Cl. ............................184/8, 184/105 C, 285/249, 285/382.7
[51] Int. Cl. ..........................................F16n 21/00
[58] Field of Search ..................184/8, 7 C, 29, 105 R, 105 C, 184/81; 285/249, 382.7

[56] References Cited

UNITED STATES PATENTS

| | | | |
|---|---|---|---|
| 1,795,297 | 3/1931 | Dirkes | 184/8 X |
| 1,883,273 | 10/1932 | Zerk | 285/382.7 X |
| 2,152,537 | 3/1939 | Couty | 285/249 |
| 2,761,704 | 9/1956 | Crawford | 285/249 X |
| 3,078,960 | 2/1963 | Minton | 184/81 |
| 3,104,899 | 9/1963 | McKenzie | 285/382.7 X |
| 3,219,367 | 11/1965 | Franck | 285/382.7 X |

Primary Examiner—Manuel A. Antonakas

[57] ABSTRACT

A greasing system which will allow greasing of all components of machines and vehicles from a central point. This system includes a multiple number of nipple fittings secured to a panel or bulkhead. The portion carrying the grease extends from the fitting to various fittings screwed into various components of the machines or vehicles that are to be greased, the system preventing the former necessity of having to apply grease to each component at its immediate location.

1 Claim, 2 Drawing Figures

INVENTOR.
STEPHEN E. BENKO, JR.

CENTRALIZED GREASING SYSTEM

This invention relates to grease fittings and the like for lubricating vehicle and machine components.

It is therefore the primary purpose of the invention to provide a centralized greasing system which will include a plurality of spaced apart grease receiving fittings which will be secured to a bulkhead or panel at a centralized remote point.

Another object of this invention is to provide a centralized greasing system which will incorporate elongated tubing means of flexible plastic or the like which will be crimped within the grease receiving fittings and within the fittings secured to the components to be greased or lubricated.

A further object of this invention is to provide a greasing system which will allow the mechanic or other person to apply grease to all of the components of a vehicle or machine by remote means having all the fittings mounted to a bulkhead or a panel, thus preventing the prior art means of greasing the machine or vehicle components from their immediate location, this system serving to decrease the amount of time and effort formerly required in lubricating the above mentioned components of machines and vehicles.

Other objects of the present invention are to provide a centralized greasing system which is simple in design, inexpensive to manufacture, rugged in construction, easy to use and efficient in operation.

Figure 1:
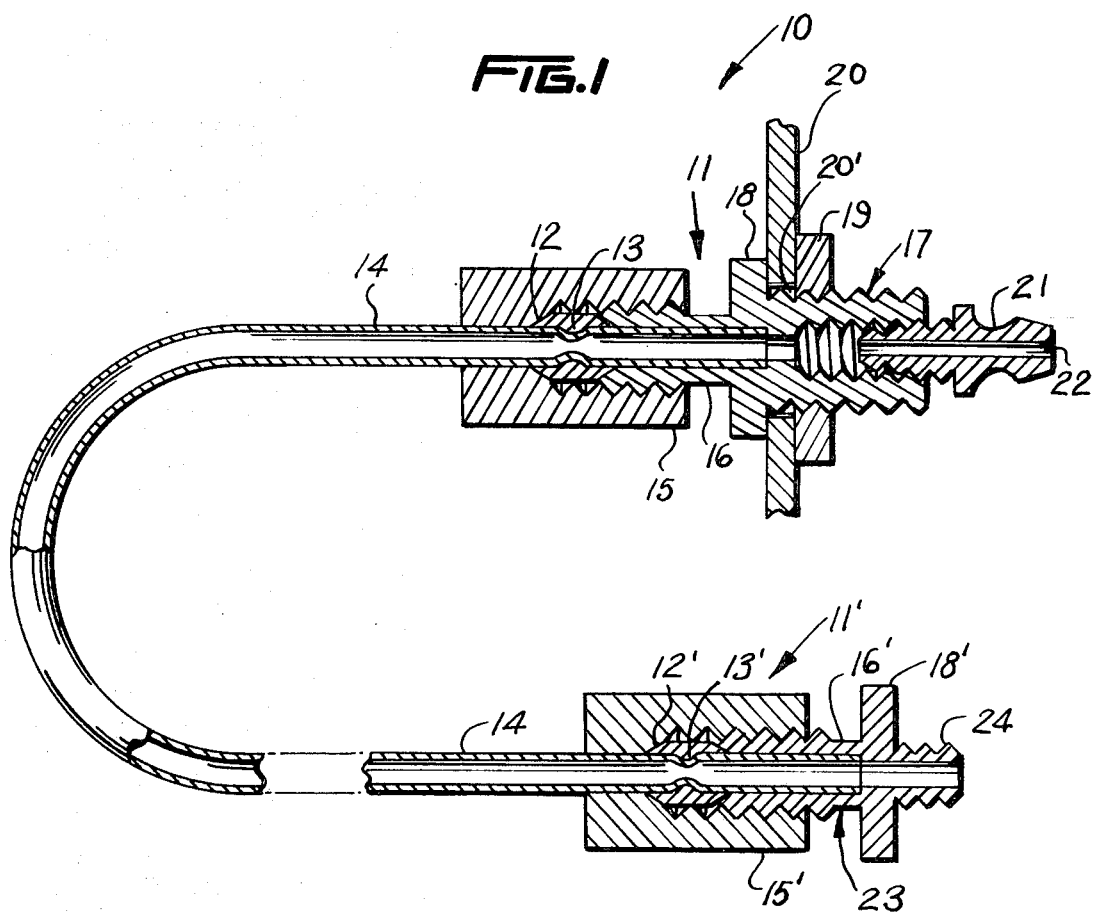
Figure 2:
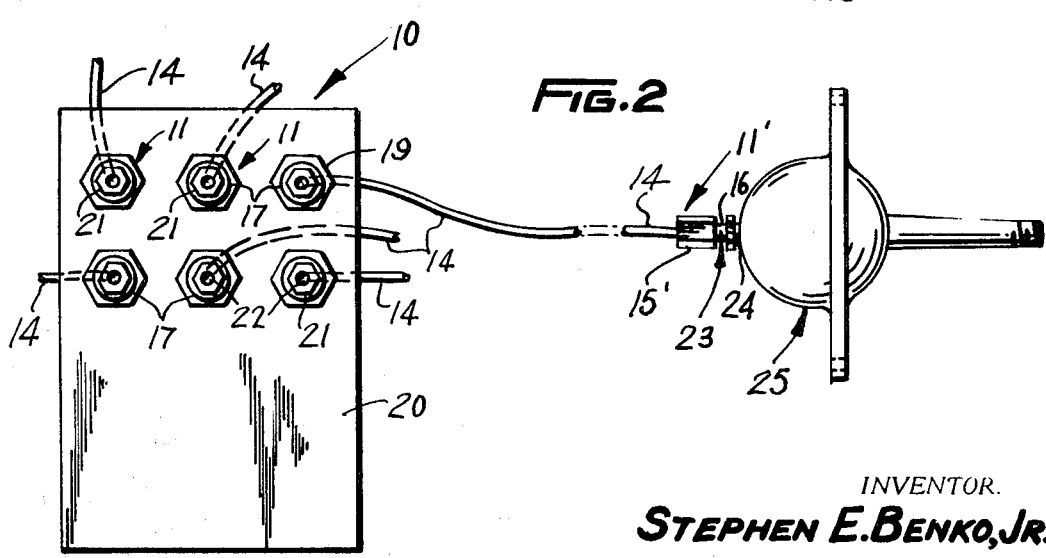

These and other objects will be readily evident upon a study of the following specification and the accompanying drawing, wherein:

FIG. 1 is a side view of one pair of the necessary fittings and interconnected tubing of the present invention, the device being shown in elevation and in section; and FIG. 2 is a front view of the bulkhead to which is mounted the grease receiving fittings, one of which is shown connected by the second fitting of a typical ball-joint, the arrangement being shown in elevation.

According to this invention, a centralized greasing system 10 is shown to include a grease receiving fitting 11 containing a soft metal sleeve 12 which provides a crimp 13 to one end of a plastic tubing 14 when nut 15 is tightened upon the externally threaded neck 16 of metal shell 17. Shell 17 is provided with a hexagonal nut 18 which by means of hexagonal nut 19 will abut with and secure shell 17 to bulkhead 20. Shell 17 is internally threaded in order to receive a common grease nipple 21 having an opening 22 for the ingressing of grease.

It shall be noted that bulkhead 20 is provided with a plurality of equally spaced apart openings 20' for receiving a plurality of shells 17 of fittings 11, the nut 19 serving to secure fittings 11 to bulkhead 20.

Tubing 14 being of flexible plastic or other suitable material is received at its other end within fitting 11'. Within fitting 11' is also included a soft metal sleeve 12' which by crimp 13' will secure tubing 14 therewithin fitting 11' when nut 15' is tightened down upon the externally threaded neck 16' of hollow metal shell 23. Fitting 11' is also provided with a hexagonal nut 18' and an externally threaded extension 24 which is screwed into a typical ball-joint 25 shown in FIG. 2 of the drawing.

It shall be noted also, that ball-joint 25 shown in FIG. 2 of the drawing is only one of the components shown that will be lubricated by means of greasing system 10. As shown, each of the fittings 11 includes a flexible plastic tubing 14 which extends from behind the bulkhead 20 to the various fittings 11' and their associated grease receiving components (not shown).

What I claim is:

1. A centralized greasing system for vehicles, machines and the like, comprising in combination, a plurality of spaced apart and panel mounted grease receiving fittings, a plurality of machine component mounted fittings carried by said system, a plurality of flexible plastic tubes carried by said system providing remote and centralized grease transport means for said system to the machine components to be greased, nut means for mounting said fittings on said system and crimping means carried by said fittings of said system for securing the ends of said plastic tubes to said fittings of said system, said fittings of said system including a hollow and internally and externally threaded shell having integral nut means providing a shoulder against one side of a bulkhead, the external threaded portion of one end of said shell carrying a hexagonal nut for jamming said shell and securing it fixedly to said bulkhead, said bulkhead including a plurality of said fittings having said shells, one end of each of said shells being externally threaded and being carried within an elongated hexagonal nut, said shell and said elongated nut carrying one end of said tube, said tube being received within a metal sleeve of soft metal on the interior of said elongated nut, said sleeve being crimped into the periphery of said tube when said elongated nut is tightened upon one end of said shell secured to said bulkhead, and the other end of said shell being received within a grease receiving nipple that is adapted to fit into the nozzle of a typical grease gun, the other end of said flexible tubing for transporting grease being received within the interior of a shell that is screwed into the opening of a component of a machine intended to be greased, said tubing being carried through an elongated nut, said nut when tightened upon the shell of said fitting received within a component to be greased causing said elongated nut to collapse and crimp said tube when said elongated nut is tightened onto one of said shell ends screwed into the component to be greased, and the elongated nuts of both said fittings being both secured by similar crimping means through the application of a conical shoulder within said elongated nut and a conical opening on the end of said fitting, the crimping being formed annularly about the outer periphery of said flexible plastic tubing for transporting said grease, and said conical shoulder and said conical opening each having a conical face, both said faces converging toward each other in a radially outward direction about an access of said nut and said shell, said conical shoulder of said nut being parallel to an abutting conical side on one end of said sleeve while the opposite end conical side of said sleeve is parallel to said conical opening on the end of said fitting.

* * * * *